United States Patent

Uchida et al.

[15] 3,671,673

[45] June 20, 1972

[54] SIGNAL SWITCHING CIRCUIT OPERABLE IN RESPONSE TO A VOICE SIGNAL

[72] Inventors: Kozo Uchida, Nishitama; Toshiyuki Tsuji, Kokubunji, both of Japan

[73] Assignee: Iwasaki Tsushinki Kaisha (also known as Iwatsu Electric Co., Ltd.), Tokyo, Japan

[22] Filed: April 6, 1971

[21] Appl. No.: 131,756

[30] Foreign Application Priority Data

April 8, 1970 Japan....................................45/29397

[52] U.S. Cl............................................................179/1 VC

[51] Int. Cl............................................................G10l 1/04

[58] Field of Search......................179/1 VC, 1 SA; 328/135; 324/77

[56] References Cited

UNITED STATES PATENTS 3,215,934 11/1965 Sallen ...................................179/1 SA

*Primary Examiner*—Kathleen H. Claffy
*Assistant Examiner*—Douglas W. Olms
*Attorney*—Robert E. Burns and Emmanuel J. Lobato

[57] ABSTRACT

A signal switching circuit operable in response to a voice signal but not operable in response to an audible periodic signal or signals, in which a pair of signal convertors having different trigger levels from each other are provided to generate a first pulse train and a second pulse train in response to respective intersections of the instantaneous level of the voice signal with the different trigger levels. A switching circuit is switched to a desired state when a difference between respective number of pulses of the first pulse train and the second pulse train reaches a predetermined value.

5 Claims, 4 Drawing Figures

SIGNAL SWITCHING CIRCUIT OPERABLE IN RESPONSE TO A VOICE SIGNAL

This invention relates to signal switching circuits employed for telephone subscriber's equipments connected to telephone subscriber's lines.

In some of conventional telephone subscriber's equipments, such as caretaking telephone devices, an operable condition of the telephone equipment is maintained during the duration of a voice signal in the subscriber's line while the operable condition is terminated in response to the termination of the voice signal. In such telephone service system, an audible signal (e.g.; a dial tone; a busy tone; a lock-out tone; etc.) is usually transmitted from a switchboard to the subscriber's telephone equipment when a user hooks a handset after completion of a desired call. In response to the audible signal from the switchboard, the subscriber's telephone equipment is spuriously triggered to the operable condition. To avoid such spurious triggering, there have been heretofore proposed an audible signal suppression system in which only the audible signal is suppressed by the use of a filter or filter, or, another system (Re: Japanese Pat. publication No. 1888/1965) in which a voice-operated switch is triggered to an inoperable condition in response to the audible signal detected by a resonance circuit. However, the above mentioned conventional equipment which operates in compliance with the frequency of the audible signal cannot be connected to a switchboard using an audible signal of a frequency different from an operable frequency of the equipment. Moreover, spurious triggering due to a frequency deviation of the audible signal and an existence of any harmonic component thereof will occur.

An object of this invention is to provide a signal switching circuit reliably operable in response to a voice signal without the above mentioned defects of the conventional equipments.

The principle, construction and operation of a signal switching circuit of this invention will be understood from the following detailed discussion taken in conjunction with the accompanying drawings, in which the same or equivalent parts are designated by the same reference numerals, characters and symbols, and in which.

Figure 1:
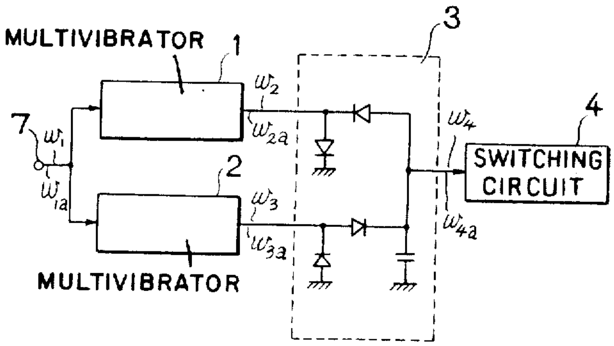
FIG. 1 is a block diagram illustrating a principal construction of a signal switching circuit according to this invention.
Figure 2A:
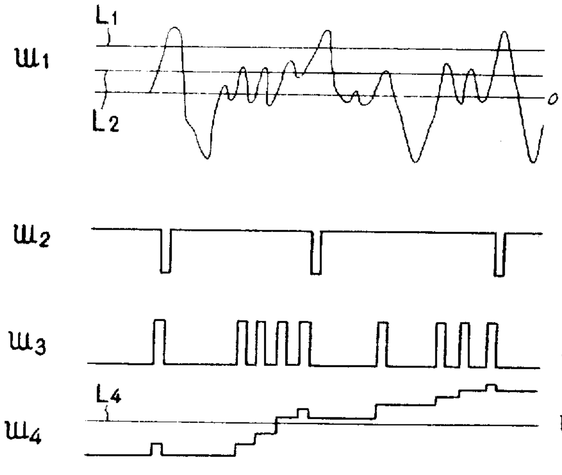
FIGS. 2A and 2B are time charts explanatory of the operation of a signal switching circuit according to this invention.
Figure 2B:
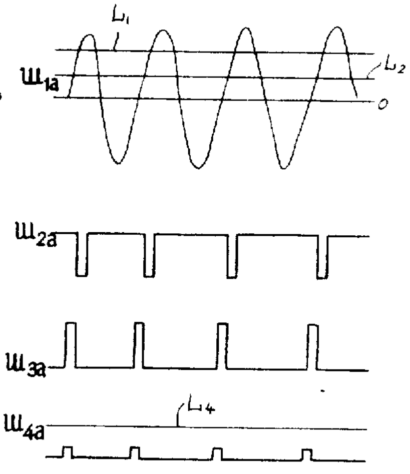

With reference to FIGS. 1, 2A and 2B, a signal switching circuit of this invention comprises an input terminal 7 to be connected to a subscriber's line, signal converters (e.g.; monostable multivibrators) 1 and 2 commonly connected to the input terminal 7 and operating at different trigger levels $L_1$ and $L_2$ respectively to generate a first pulse train $W_2$ or $W_{2a}$ and a second pulse train $W_3$ or $W_{3a}$, a comparator 3 connected to the outputs of the multivibrators 1 and 2 and detecting a difference between the respective numbers of the first pulse train ($W_2$ or $W_{2a}$) and the second pulse train $W_3$ or $W_{3a}$, and a switching circuit 4 connected to the comparator 3 and switched on the ON-state or the OFF-state when the difference detected by the comparator 3 reaches a predetermined value.

In the example shown in FIG. 1, the multivibrator 1 generates pulses of negative polarity, while the multivibrator 2 generates pulses of positive polarity.

FIG. 2A shows time charts of operation in receiving a voice signal $w_1$, and FIG. 2B shows time charts for operation in receiving an audible signal $w_{1a}$. As readily understood from FIGS. 2A and 2B the respective numbers of the first pulse train $w_2$ and the second pulse train $w_3$ for the voice signal $w_1$ are different from each other, while the respective numbers of the first pulse train $w_{2a}$ and the second pulse train $w_{3a}$ for the audible signal $w_{1a}$ are equal to each other. Accordingly, an output $w_4$ obtained from the comparator 3 in a case of the voice signal exceeds a trigger level $L_4$, of the switching circuit 4. However, an output $w_{4a}$ obtained from the comparator 3 in a case of the audible signal cannot reach the trigger level $L_4$ of the switching circuit 4. Consequently, the switching circuit 4 is reliably switched in response to only the voice signal $w_1$ without affection by the audible signal $w_{1a}$.

The audible signal ($w_{1a}$) is usually a sinusoidal wave, so that respective occurrence times of pulses of the first pulse train $w_{2a}$ and the second pulse train $w_{3a}$ are slightly different from one another for each pair of corresponding pulses. Accordingly, the comparator 3 cannot be formed by a difference circuit only, but further comprises integration means, such as a capacitor.

In the above description, it is assumed that the respective trigger levels $L_1$ and $L_2$ of the multivibrators 1 and 2 are both positive. However, the trigger levels $L_1$ and $L_2$ may be both negative for desired operations.

In addition to the above explanation, pulses of the first pulse train may be generated every intersection of the input wave and the trigger level $L_1$, while pulses of the second pulse train may be generated every intersection of the input wave and the trigger level $L_2$.

The comparator 3 may be a reversible counter having a scale determined in view of a sufficient margin for spurious triggering by the audible signal. In this case, the switching circuit is switched in response to a carry pulse of the reversible counter.

Figure 3:
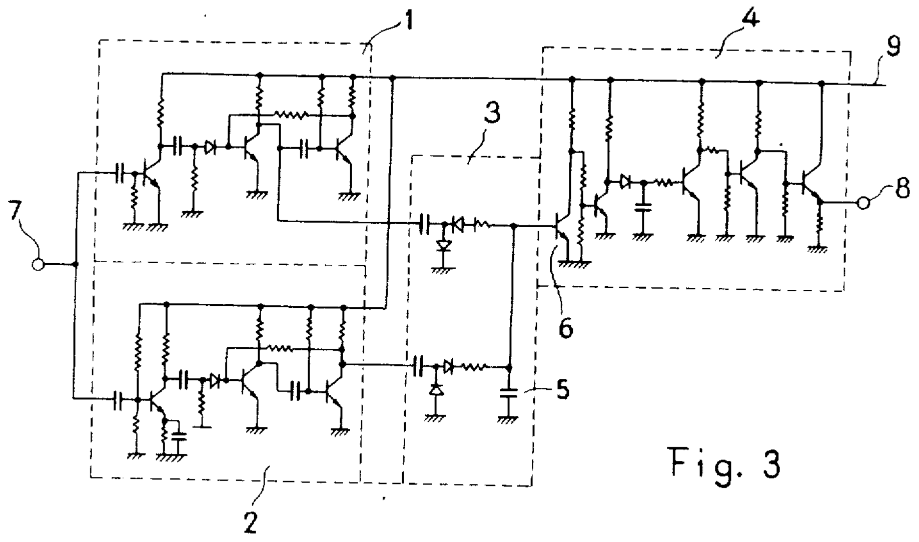
FIG. 3 is a circuit diagram illustrating an embodiment of this invention.

A detailed example of this invention is shown in FIG. 3, in which a charged voltage of a capacitor 5 in the comparator 3 is discharged through a transistor 6 in response to the termination of the voice signal. Accordingly, a switched output can be obtained from an output terminal 8 only a duration where the voice signal continues.

As mentioned above, since the signal switching circuit of this invention is controlled in accordance with a difference between respective numbers of intersections of an input signal with two trigger levels, a reliable switching circuit which is correctly switched in response to a voice signal irrespectively of the frequency of an audible signal used in a switching system can be realized in accordance with this invention.

What we claim is:

1. A signal switching circuit, comprising:

input terminal means, for receiving at least a voice signal;

first signal conversion means connected to said input terminal means for generating pulses of a first pulse train in response to at least every unidirectional intersection of the instantaneous level of the voice signal with a first trigger level;

second signal conversion means connected to said input terminal means for generating pulses of a second pulse train in response to at least every unidirectional intersection of the instantaneous level of the voice signal with a second trigger level different from said first trigger level;

comparator means connected to said first and second signal conversion means for detecting a difference between respective numbers of pulses of said first pulse train and said second pulse train; and switching means connected to said comparator means and switched to a desired state when said difference reaches a predetermined value.

2. A signal switching circuit according to claim 1, in which each of said first and second signal conversion means comprises a monostable multivibrator.

3. A signal switching circuit according to claim 1, in which said comparator means comprises a capacitor for integrating a difference voltage corresponding to said difference.

4. A signal switching circuit according to claim 3, in which said switching means is switched when said integrated difference voltage reaches a threshold level corresponding to said predetermined value.

5. A signal switching circuit according to claim 1, in which said comparator means comprises a reversible counter, and in which said switching means is switched in response to a carry pulse of said reversible counter.

* * * * *